Sept. 30, 1952 P. M. HENKES ET AL 2,612,134
MICROMETER DIAL FOR MACHINE AND THE LIKE TOOLS
Filed Sept. 28, 1950 2 SHEETS—SHEET 1
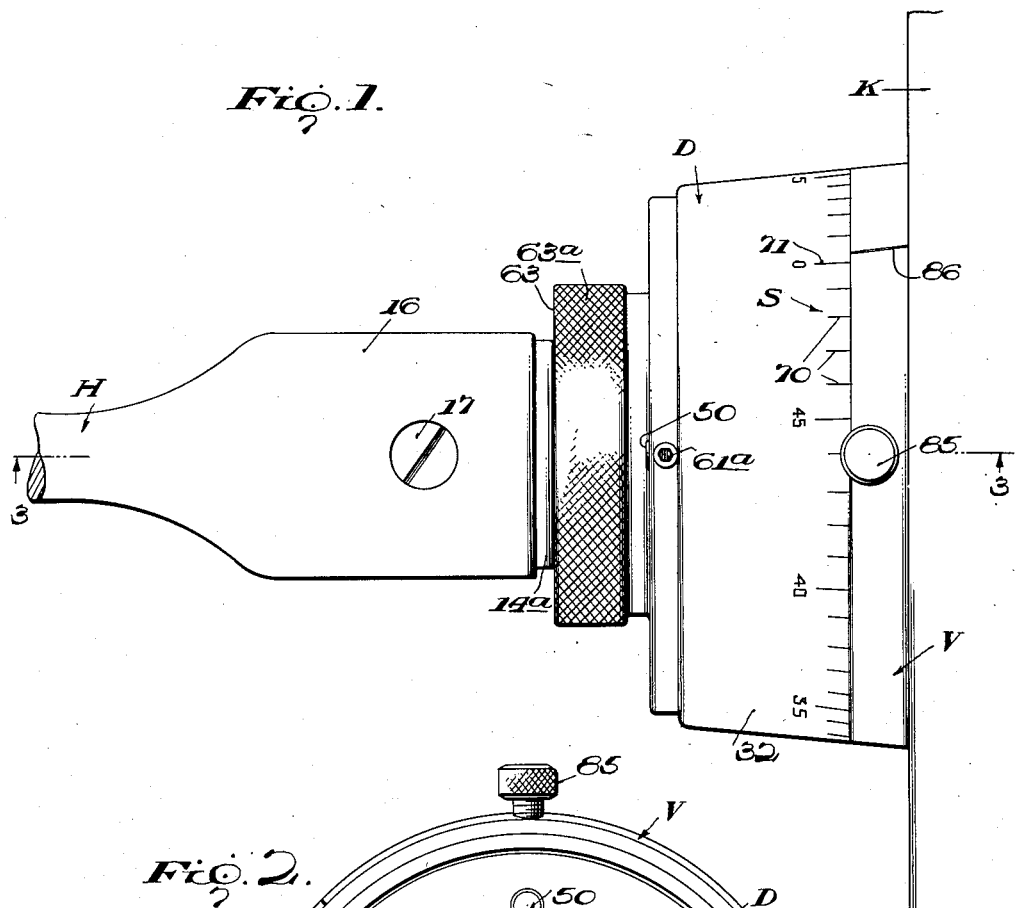
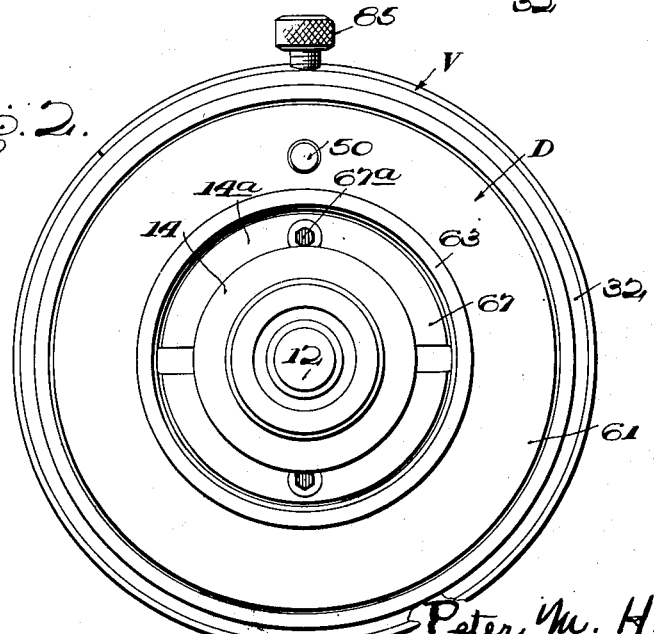
INVENTORS:
Peter M. Henkes
Elton L. Miottel
BY Peck + Peck ATTORNEYS.

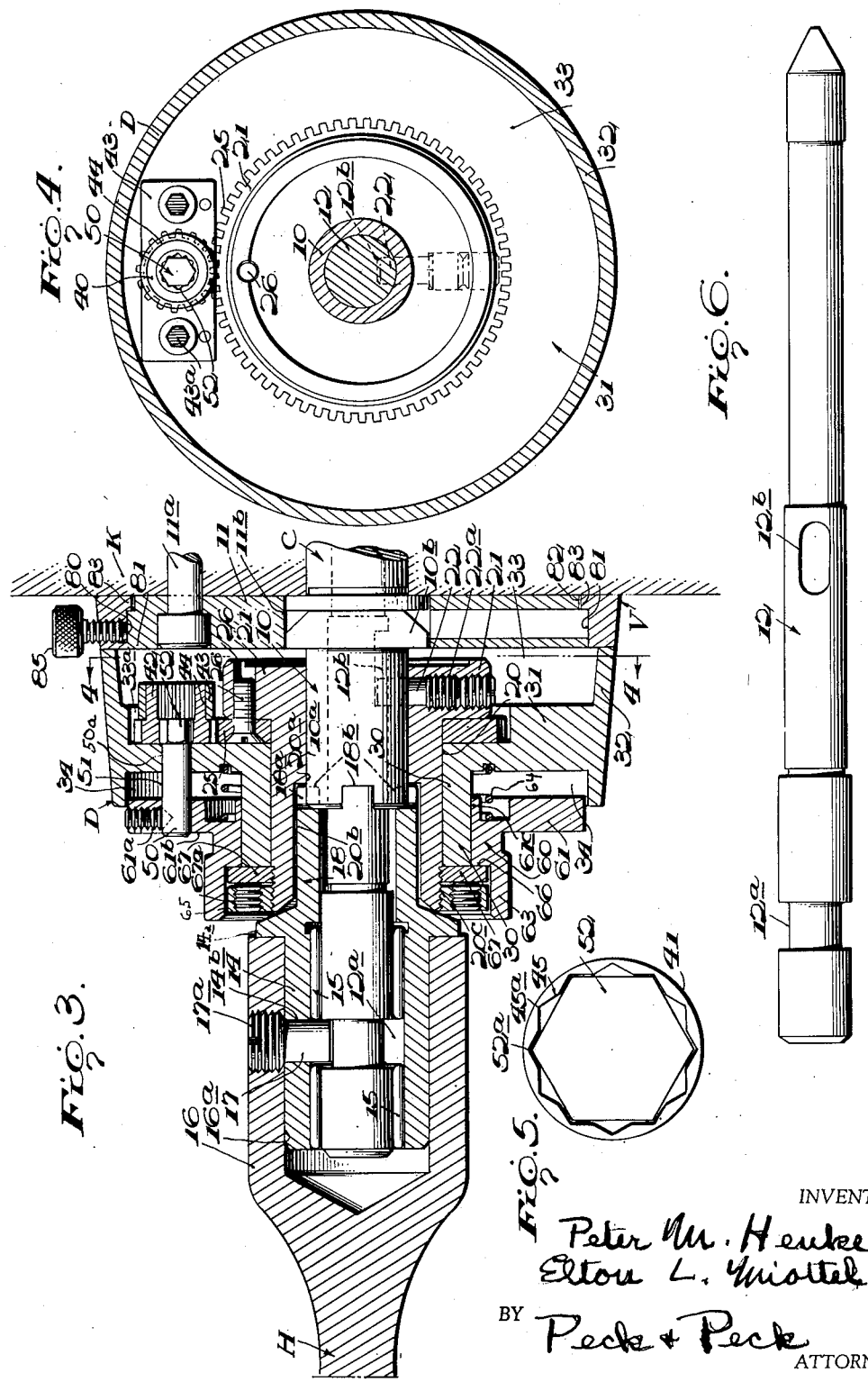

Patented Sept. 30, 1952

2,612,134

UNITED STATES PATENT OFFICE 2,612,134

MICROMETER DIAL FOR MACHINE AND THE LIKE TOOLS

Peter M. Henkes and Elton L. Miottel, Racine, Wis., assignors to George Gorton Machine Co., Racine, Wis., a corporation of Wisconsin Application September 28, 1950, Serial No. 187,210

13 Claims. (Cl. 116—133)

This invention relates to certain improvements in micrometer dials, and particularly such dials as used on milling, grinding, boring and such like machines; and the nature and objects of the invention will be readily recognized and understood by those skilled in the art in light of the following explanation and detailed description of the accompanying drawings illustrating what we at present believe to be a preferred embodiment or mechanical expression of our invention from among various other embodiments, forms, adaptations, and arrangements, of which the invention is capable within the broad spirit and scope thereof as defined by the appended claims.

So-called micrometer dials are widely used on various types of machines which include slides or movable elements actuated by rotary shaft members, such for example as feed screws, for accurately feeding the slides to relatively move with precision a work piece or other member and a cutting tool or other element. Such micrometer dials as generally used, take the form of a usually circular dial member or disk which is adjustably mounted on and concentric with the rotary feed screw or rotary element for rotation therewith. The micrometer dial is provided with a micrometer scale in visible position thereon and thereround, the scale usually providing divisions each corresponding to one thousandth of an inch (.001") of straight line or linear movement of the slide member which is to be actuated and fed by the feed screw. The dial is usually mounted in position on the feed screw or rotary member, the degree of rotation of which is to be measured on the dial scale in terms of resultant linear distance of feed of the slide member which is to be actuated and fed by the feed screw. Such dial is usually mounted in position on the feed screw or rotary member in position adjacent relatively fixed structure bearing thereon a reading point or index line immediately adjacent the scale around the dial, so that the operator may read the scale against the index line. Usually such a micrometer dial is mounted for independent rotation on the feed screw or rotary element to adjust the micrometer scale relative to the position of the feed screw and the slide member fed thereby, with some form of means being provided for releasably securing the micrometer dial in an adjusted position on the feed screw for rotation with the screw.

The use of such micrometer dials on various types of machine tools, and particularly those machines in which the slide members are power fed by power rotation of the feed screw has presented certain problems and difficulties; and it is a general object of our invention to provide an improved design and construction of micrometer dial by which certain of such problems and difficulties are eliminated or minimized.

One of the difficulties heretofore encountered is the occupational hazard to an operator arising out of the fact that in the operation of a machine of the type having power driven feed screws, a micrometer dial mounted on such a power driven feed screw may reach speeds of rotation as high as 600 R. P. M. Hence, contact with a rotating micrometer dial by the fingers or hand of an operator can result in serious injuries, and this injury hazard is increased when the micrometer dial has breaks in its periphery, or locates any adjusting member in a projecting or inwardly located or relatively inaccessible position.

One of the primary objects of the invention is to provide a design, construction and mounting by which such occupational hazard is substantially reduced; and in carrying out this object we provide a design and construction of micrometer dial mechanism in which the periphery of the dial body is maintained as a continuous, smooth and unbroken annular surface, and the major, manually operable element for effecting engagement and disengagement of the dial body with the rotary element for adjusting the dial, is located completely at the forward side of the dial body in an unobstructed, readily visible and accessible position.

With the types of micrometer dials as heretofore generally available, an operator could never be certain that the dial was properly engaged and firmly secured in an adjusted position. Hence, if an operator was not alert and extremely careful, an incorrect or insecure adjustment might be made which, unless corrected by a complete resetting of the dial by the operator, might cause damage of considerable magnitude to the work being operated upon with consequent serious losses.

A further object is to provide a micrometer dial mechanism wherein the dial is normally maintained automatically in an engaged, operative position but may be readily disengaged by the operator from an operative position for adjustment by a simple manipulation of a manually operable member, and without requiring the use of set screws or similar fastening or securing elements necessitating the use of wrenches or other tools in order to engage and disengage the micrometer dial in and from operative adjusted positions.

A further object is to provide an improved mechanism for positively releasably locking the dial in an adjusted position securely held against displacement under all operating conditions; and in implementing this object we may provide such mechanism in the form of a gear member in constant mesh with a relatively small diameter pinion gear member together with means for locking said pinion member against and for releasing said member for rotation.

Another primary object is to provide a micrometer dial which may be set by the operator to absolute zero.

A further object is to provide a micrometer dial mechanism which permits an operator to adjust the micrometer dial component thereof to obtain absolute zero quickly and with a minimum of effort.

And a further object is to provide a micrometer mechanism which includes in combination with the dial component, an adjustable index component movably mounted on fixed structure adjacent the dial component for selective adjustment by an operator to positions relative to the dial component and its scale to obtain a setting of absolute zero for the dial mechanism.

A further object is to provide a device having a minimum of parts, economical to manufacture, efficient in operation and readily adaptable for the purposes for which intended.

With the foregoing and certain other objects, features and results in view which will be readily apparent from the following detailed description and explanation, the invention consists in certain novel features in design and construction of parts, elements and organizations and in the various combinations thereof, all as will be more fully referred to and specified hereinafter.

Referring to the accompanying drawings in which similar reference characters refer to corresponding parts throughout the several figures thereof:

Fig. 1 is a view in top plan of one form of micrometer dial mechanism of our invention mounted on the cross feed screw of a milling machine, a portion only of which is shown, and showing the index ring of the dial mechanism mounted on adjacent fixed frame structure of the machine.

Fig. 2 is a view in front elevation of the micrometer dial mechanism of Fig. 1, the feed screw operating hand crank having been removed.

Fig. 3 is a vertical longitudinal section through the micrometer dial mechanism of Fig. 1, taken as on the line 3—3 of Fig. 1.

Fig. 4 is a transverse sectional view taken as on the line 4—4 of Fig. 3.

Fig. 5 is a fragmentary view in rear side elevation of a portion of the dial pinion surrounding the pinion lock receiving bore therethrough, showing particularly the toothed or notched contour of the surface surrounding such bore.

Fig. 6 is a view in side elevation of the hand crank operated release shaft associated with the feed screw.

The example embodiment of a micrometer dial mechanism herein disclosed as embodying our invention, is of a type particularly adapted to and intended for mounting on and in association with a power driven feed screw of a machine tool, such for example as a milling machine having a knee, saddle and table assembly familiar in the machine tool art. However, micrometer dial mechanisms embodying our invention are in no sense limited or restricted to any particular feed screw of a milling machine or other machine tool, or to mounting on and in combination with feed screws, as the invention may be expressed and implemented in various forms and adaptations for precise measurements resulting from or of rotation of, any form of rotary shaft or other rotary element. Hence, it is not intended by the example embodiment and its association with a feed screw of a machine tool, to thereby limit or restrict the invention to such adaptation and use.

Referring to the accompanying drawings, with particular reference to Figs. 1 and 3, a portion of the front or vertical wall K of a knee, saddle and table assembly (not shown) of a milling machine, is shown with the forward length of a knee mounted cross feed screw C extending forwardly through and outwardly beyond the forward wall K. In this example the feed screw C may be considered to be of any of the power driven types familiar in the machine tool art.

The forward end of feed screw C extends through a suitable bore or opening in wall structure K and is provided with an integral extension 10 which extends forwardly a distance outwardly beyond wall K to form a stub shaft providing therearound a smooth, bearing forming surface 10a concentric with the axis of the shaft. A circular bearing plate 11 is attached and secured by fastening bolts or the like 11a, against the forward side of knee structure K with its peripheral surface concentric with the axis of feed screw C. Bearing plate 11 is provided with an axial bore 11b therethrough which rotatably receives therein an enlarged diameter, flange forming portion 10b integral with and joining feed screw C and extension shaft 10. Any suitable anti-friction bearing assembly (not shown) may be mounted in plate 11 within bore 11b thereof with the flange 10b journaled therein and thus providing a forward bearing support for feed screw C and its extension 10.

The feed screw C and shaft extension 10 thereof are formed with an axial bore therethrough in which there is slidably mounted a rod or shaft member 12 for operative association at its inner end with any suitable "knock-out" mechanism (not shown) as will be familiar to those skilled in the machine tool art. This release shaft 12, referring now to Fig. 3, extends forwardly and outwardly beyond the outer end of feed screw shaft extension 10, and a sleeve member 14 is rotatably journaled on and over the extended length of release shaft 12 by means of any suitable bearings, such as the annular, needle bearing assemblies 15.

The sleeve 14 mounts on its outer end length the hub 16 of a usual hand crank H, the hub 16 providing the usual open end bore or socket 16a therein which receives sleeve 14 with the inner surface of hub 16 surrounding bore 16a being seated on sleeve 14. Sleeve 14 intermediate its length is provided with a radially outwardly extended flange 14a therearound which at its forward side provides an annular seating surface against which the inner end of hand crank hub 16 abuts and seats. Hub 16 is attached on sleeve 14 in non-rotative relation therewith by means of a pin 17 having a head 17a threaded into a bore formed through hub 16, with pin 17 being fitted in and extending through a bore 14b through the side wall of flange 14. The release shaft 12 is provided with an annular groove 12a therearound into which the radially inwardly projected end of pin 17 extends and is slidably received, so that, the hand crank H with sleeve 14 may be rotated on and independently of the release shaft 12, while the release shaft 12 may be moved axially inwardly and outwardly through feed screw C and shaft extension 10, as a unit assembly with crank H, by inward and outward movements of the crank, due to the engagement of pin 17 with the opposite side walls of groove 12a. (See Fig. 3.)

The inwardly extended length 18 of sleeve 14 between the flange 14a and the inner end of the sleeve, is formed of reduced external diameter and is provided at its annular, inner end edge portion with pairs of diametrically opposite clutch teeth 18a extended rearwardly therefrom. The outer end of the feed screw extension shaft 10 has milled or otherwise formed thereacross a pair of grooves 18b perpendicular to each other for receiving therein the clutch teeth 18a of the clutch member 18 of sleeve 14. Thus, when sleeve 14 is forced inwardly together with release shaft 12, by inward movement of hand crank H, the clutch teeth 18a engage grooves 18b of shaft extension 10 to thereby clutch extension 10 to sleeve 14, so that the feed screw C may be manually rotated in either direction by rotation of crank H. This clutched position is shown in Fig. 3. When feed screw C with its shaft extension 10 are to be power driven, crank H is drawn outwardly to thereby move sleeve 14 outwardly with release shaft 12, to a position with the clutch teeth 18a disengaged from shaft grooves 18b. Feed screw C and shaft extension 10 may then be power rotated independently and without effecting power rotation of the hand crank, even though release shaft 12 is also rotated, as pin 17 merely freely slides in and around groove 12a in the release shaft 12.

The micrometer dial mechanism of the invention in the form herein illustrated for mounting and operative association with feed screw C and its shaft extension 10, includes a dial body or unit D mounted on shaft extension 10 for either rotation with that shaft or rotation relative thereto to positions of adjustment thereon and therearound. In this example, the micrometer dial body unit D is mounted on shaft extension 10 by means of a dial mounting and bearing forming sleeve unit 20. This sleeve unit 20 is formed with an axial bore therethrough having the portion 20a thereof of an internal diameter to receive therein and therethrough shaft extension 10 with the surface surrounding bore portion 20a complementary to and forming a rotative bearing fit with surface 10a of sleeve 10. The forward length 20b of the bore through sleeve unit 20 is formed of increased internal diameter so as to freely receive therein with clearance the reduced diameter clutch forming portion 18 of the hand crank mounting sleeve 14, so that sleeves 18 and 12 are freely rotatable relative to and independently of each other. The outer end of sleeve 20 terminates at the inner side of flange 14a of crank mounting flange 14 but with operating clearance therebetween even with sleeve 14 at its limit of inward movement with the sleeve clutched with shaft extension 10.

At its inner end mounting sleeve 20 is formed with an annular, radially outwardly extended flange 21 therearound. A gear member in the form of a ring gear 25 having an internal diameter to fit on and receive therethrough sleeve 20 is mounted on this sleeve in position at and secured against and around the forward side of the clamping flange 21, by means of suitable fastening members, such as the machine screws 26. The width of ring gear 25 is such that its toothed periphery is located radially outwardly beyond the peripheral surface of flange 12.

The sleeve unit 20 is keyed to shaft extension 10 by means of a pin 22 extended inwardly through a bore formed radially in flange 21. Pin 22 has a threaded head 22a by which it may be threaded into the flange. Pin 22 fits in and extends through a bore in the adjacent side wall of shaft 10, with the inner end of the pin being received in an axially extended groove 12b formed in the side of release shaft 12. The pin 22 thus secures shaft 12 within shaft extension 10 for rotation therewith as a unit while permitting the axial in and out movements of the release shaft in and independently of shaft extension 10.

The micrometer dial unit D is in the form of a circular housing comprised of a hub forming sleeve member 30 having at its inner end a generally circular body wall 31 in a plane perpendicular to the axis of the hub and extending radially outwardly therefrom and therearound. A dial forming, circular, peripheral side wall or skirt 32 is formed integral with and around the peripheral portion of body wall 31 and provides an unbroken, smooth peripheral surface therearound concentric with the axis of the hub sleeve 30. In this example the dial forming peripheral wall or skirt 32 has a width considerably greater than the thickness of the body wall 31 and extends forwardly and rearwardly beyond the body wall so as to form at the rear side of that wall a space 33 and at the forward side of the wall a space 34 with both of these spaces open at their outer sides. The peripheral side wall or skirt 32 is preferably tapered or flared outwardly from its forward side to its rear edges, so that the forward side has a smaller external diameter than the external diameter of the rear side or edge. In this instance, the hub forming sleeve 30 extends forwardly from the body wall 31 and projects a distance outwardly beyond the forward edge of the peripheral side wall or skirt 32.

The micrometer dial unit D is mounted on the bearing sleeve 20 in position with the hub 30 of the micrometer unit rotatably mounted on said sleeve in position extended forwardly therealong and terminating at its forward end spaced a distance rearwardly from and around the flange 14a of the hand crank mounting sleeve 14. In this mounted position, the body wall 31 of the dial unit is engaged at its rear side against the ring gear 25 which is secured to the clamping flange 21 of sleeve 20, and with the peripheral side wall or skirt 32 of the dial unit extending rearwardly to and having its rear edge lying in the plane of the forward face or side surface of the bearing plate 11. Thus, the dial unit with bearing plate 11 encloses and houses therewithin between plate 11 and the body wall 31 of the dial unit, the clamp flange 21 and ring gear 25. So mounted, the dial unit D is rotatable on sleeve 20 to positions of adjustment around and relative to feed screw C and its shaft extension 10, or if suitably locked against rotation relative to sleeve 20, then becomes rotatable with that sleeve as the latter is rotated by and with shaft extension 10.

We provide mechanism associated with the ring gear 25 of sleeve unit 20 by which we obtain positive locking in any desired position of adjustment, of the micrometer dial unit D on the mounting sleeve 20, for rotation of the dial unit in its adjusted position with the feed screw C and shaft extension 10. In this instance, such mechanism includes a pinion gear unit 40 which is mounted and journaled in position at the rear side of body wall 31 in constant mesh with ring gear 25, together with operator controlled means for releasably locking the pinion unit 40 against rotation to thereby lock the dial unit D in an adjusted position.

Referring to Figs. 3 and 4, the pinion gear unit 40 includes a pinion 41 and an extended hub portion 42 at one side of the pinion with an axial bore extending through the unit comprised by hub 42 and the pinion 41. The extended hub 42 has an external diameter less than the maximum external diameter of the pinion 41, so that the toothed periphery of the pinion extends radially beyond the extended hub. (See Fig. 3.) The portion of the axial bore through the pinion 41 of the unit is slightly less than the internal diameter of the bore through the extended hub 42, and the pinion bore is broached out or otherwise suitably formed to provide therearound a series of twelve (12) equally spaced, radially disposed, identically shaped notches therein providing by their apexes 45a twelve (12) equally spaced points forming a toothed internal gear portion 45 for the pinion. Such internal, twelve (12) pointed gear portion 45 of the pinion is illustrated in detail in Fig. 5.

At the mounting location within the space 33 of the dial unit D for the pinion gear unit 40, the body wall 31 is recessed at 33a and this recess is bridged by a bearing plate 43 which is secured to the body wall at opposite sides of the recess by suitable fastening means, such as the machine screws 43a (see Fig. 4). The bearing plate 43 provides a bearing 44 in which the extended hub 42 of the pinion gear unit 40 is mounted and journaled with the pinion 41 of the unit located in the recess 33a between the bearing plate 43 and the inner side wall of the recess (see Fig. 3). The mounted position of the pinion gear unit 40 locates the pinion 41 for rotation about an axis parallel with the axis of rotation of shaft extension 10, and with the pinion in mesh with the ring gear 25 on the clamping flange 21 of the dial mounting sleeve 20. It follows, therefore, that rotation of the dial unit D on and relative to mounting sleeve 20 will cause pinion gear 41 to revolve about and follow around gear 25 while being rotated thereby in mesh therewith as an idler about the axis of its mounting hub 42. When, however, pinion 41 is constrained against rotation, the dial unit D becomes locked positively to the mounting sleeve 20 and shaft extension 10.

A form of operator controlled locking means for effecting locking of pinion 41 to lock the dial unit D in a selected position of adjustment, and for releasing pinion 41 for free rotation to thereby permit of rotating the dial unit D on mounting sleeve 20 to a desired position of adjustment, is shown in the selected example hereof as embodying a lock member or pin 50 mounted in the dial unit for operative association with pinion gear unit 40. Referring to Figs. 3 and 4, this lock pin 50 comprises a smooth surface shank 51 having at one end thereof a hexagon head 52.

Lock pin 50 is reciprocally mounted in a bore 50a formed transversely through body wall 31 of dial unit D, with this bore opening into and in axial alignment with the axial bore through the pinion gear unit 40. In mounted position lock pin 50 has the hexagon head 52 therein located at the inner end of the pin and within the bore through the pinion gear unit 40. When in its maximum position of forward or outward movement, the lock pin 50 locates the hexagon head 52 thereof in the twelve (12) pointed toothed internal gear 45, with the six (6) edges (teeth) 52a of the hexagon head engaged in alternate points 45a, respectively, of the internal gear 45 of the gear unit 40, as will be clear by reference to Fig. 5. With the lock pin 50 moved rearwardly the hexagon head 52 thereof is moved rearwardly from engagement in the internal gear 45 to position clear thereof and located within the bore of the pinion gear unit 40 within the extended hub 41 of that unit. In this unlocking position of pin 50, the pinion gear unit 40 is released for free rotation to thereby release the dial unit D for a rotation in either direction on and around mounting sleeve 20, to a selected position of adjustment.

Following the teachings of our invention, we provide for operator control of the locking pin 51 for effecting actuation of the pin from and to dial locking and unlocking positions. In the particular example hereof we provide for such control through the medium of a manually operable shifter member 60 which we locate completely at the front or forward side of the dial unit D in position readily visible and accessible to an operator. Such shifter member 60 may take the form of a circular plate 61 having an axially bored hub 62 which is slidably mounted on and receives therethrough the forwardly extended hub forming sleeve 42 of the dial unit D, as will be clear by reference to Fig. 3. The external diameter of plate 61 of shifter member 60 is slightly less than the maximum internal diameter across the dial unit D of the annular recess 34 formed at the forward side of that unit around and surrounding the hub 42. Thus mounted, shifter member 60 may be moved inwardly on and axially of hub 42 to position received and nested within the annular recess 34, or may be moved outwardly on and axially of hub 42 to a position as shown in Fig. 3, with the plate 61 of member 60 located at the forward side of recess 34. The hub 62 of member 60 is extended or projected forwardly from plate 61 to provide a circular operating knob 63 positioned on and around forwardly extended hub 42 of unit D between flange 14a and the dial unit D. The peripheral surface around knob 63 may be provided with suitable knurling 63a.

The forwardly projected end of locking pin 51 extends through a bore formed through plate 61 of the shifter member and such end of the pin is secured and locked to plate 61 by a suitable lock or set screw 61a. With lock pin 51 secured to plate 61 of shifter member 60, inward movement of the shifter member will move pin 51 rearwardly from position with head 52 engaged in internal gear 45 of pinion unit 40, to position within the bore of the extended hub 42 of the pinion unit and disengaged from gear 45, to thus release the pinion unit for free rotation of pinion 41. From this pinion releasing position, head 52 with pin 51 is moved forwardly into locking engagement with internal gear 45, by forward movement of the shifter member 60 to the position thereof shown in Fig. 3.

In the example embodiment hereof, the shifter member 60 is spring loaded and is continuously biased to its maximum position of forward movement on dial hub 30 with the head 52 in position locking pinion unit 40 against rotation. This biasing of shifter member 60 is effected, in this instance, by a coil expansion spring 64 which is mounted in position over and around hub 30 of the dial unit D, between the forward side of dial body wall 31 and the inner side of plate 61 of the shifter member. Preferably an annular recess 61b is provided in the inner side of plate 61 around the hub bore therethrough for receiving and seating therein the forward end of spring 64. Similarly, the dial body wall 31 may be formed with an annular groove 31a therein for receiving and seating the rear or inner end of spring 64. The annular portion 61c of plate 61 between spring seating recess 61b and the hub bore, may form a shoulder for engaging the forward side of dial body wall 31 to limit inward movement of the shifter member in its dial unlocking position.

A counterbore 65 is formed through the forward side of the circular knob 63 to provide in and around the inner end thereof the annular abutment shoulder 66. In this annular recess formed by counterbore 65 and the annular space between the end of dial hub 30 and the flange 14a, there is mounted an annular nut member 67 which is internally threaded and screwed onto external threading 20c provided on the forward end of hub forming sleeve 20. This nut member is held in locked position by set screws 67a. Nut member 67 extends radially outwardly beyond and around the forward end of dial hub 30 and thus provides a seating member against which the annular shoulder 66 of shifter member 60 seats and abuts when the shifter member is in its normal dial-locking position, forwardly biased by spring 64.

With the shifter member 60 arranged and mounted as above described, it is normally maintained by spring 64 in forwardly projected position with head 52 of lock pin 51 engaged in internal gear 45 of pinion unit 40 to thus maintain the dial unit D locked in fixed position against displacement on and rotatable with the dial mounting sleeve 20. When it is desired to release the dial unit D for rotation on sleeve 20 to an adjusted position relative to shaft extension 10, the operator merely grasps knob 63 and presses this knob inwardly to move the shifter unit against the action of spring 64 to a position with lock pin 51 moved rearwardly to disengage its head 52 from the internal gear 45 of the pinion gear unit 40. While holding the shifter member 60 in rearwardly depressed, dial unlocking position, the operator then may rotate the dial to the desired position of adjustment. When the dial unit D has been set up in adjusted position, the operator merely releases knob 63, whereupon spring 64 instantly functions to return shifter member 60 to its forwardly projected position with head 52 of lock pin 51 engaged with internal gear 45 of the pinion unit 40 to thereby lock the latter unit against rotation.

The dial unit D is provided on and around the peripheral surface of the circular side wall or skirt 32 thereof with a micrometer scale S comprised of the division or graduation lines 80, which in this instance, are numbered by tens starting with the zero line 71. The scale lines 70 and 71 are disposed axially of the dial unit in the usual manner and extend to the adjacent peripheral edge of the skirt 32. In accordance with a further feature of our invention we provide an index member mounted and supported on fixed structure in position adjacent and in co-operative relationship with the dial unit D and the micrometer scale S on and around the side wall or skirt of that unit.

In the example adaptation of micrometer dial mechanim of our invention for association with the feed screw C of a machine tool, this index member takes the form of an annulus or ring V mounted and supported on and around the peripheral portion of the circular bearing plate 11 which is fixed to the structure K of the machine, with this ring member being rotatable on plate 11 about the axis of feed screw C and shaft 10 as a center. In carrying out such mounting of the index ring V we provide the peripheral edge portion 80 of bearing plate 11 as truly concentric with the axis of screw C, and shaft 10, which axis also constitutes the axis of rotation of dial unit D. Such truly concentric peripheral edge surface 80 of plate 11, in this instance, has an external diameter less than the external diameter of the side wall or skirt 32 at the inner or large diameter end of the skirt. The index ring V is formed around the inner periphery thereof to provide a surface 81 truly concentric with the axis of plate 11 and complementary to the surface 80 of the plate and the ring is mounted on and around the plate with the surfaces 80 and 81 in rotative bearing engagement so that the ring may be rotated to various positions of adjustment on and around the plate. The plate 11 is formed with a reduced external diameter portion 82 therearound at the inner side of surface 80 and between the latter surface and the forward surface of structure K. The index ring V is formed with a radially inwardly extended guide flange 83 therearound which has its inner peripheral portion provided by the reduced diameter portion 82 of plate 11 with the forward side of that flange having sliding, bearing engagement against the shoulder formed between bearing surface 80 and the reduced diameter portion 82 of the plate. In this manner the vernier ring V is mounted for rotation on and around bearing plate 11 to various positions of adjustment thereon and therearound.

The external diameter of the index ring V at the forward side thereof is the same as the external diameter of the adjacent inner side of the skirt 32, so that the peripheral surface of ring V is flush with and forms a rearward continuation of the peripheral surface of the skirt. In this instance, the peripheral surface of ring V is of progressively increasing diameter inwardly therealong so as to form a bevel or taper of the same angle as the taper or flare given to the skirt 32. A lock screw 85 is threaded into and through a radially disposed threaded bore through ring V for locking engagement at its inner end with the peripheral surface 80 of the bearing plate 11. This screw 85 serves the purpose of releasably locking the index ring V in any selected position of adjustment.

The index ring V is in the example embodiment hereof provided with an index line 86 thereon for positioning and setting relative to the scale S on the dial unit, by rotation of the ring on bearing plate 11, such rotation being, of course, independent of dial unit D and on the fixed support provided by the bearing plate 11. For example, with the micrometer dial mechanism of the illustrated example, the operator may accurately and precisely establish a setting by first depressing, or pressing inwardly, the forwardly located lock control knob 63 to thereby unlock and release the dial unit D from the shaft carried gear 25. While holding the knob in depressed position, the operator then rotates the dial unit D to the approximate desired setting within the capabilities of the machine. When this setting is reached the operator merely releases knob 63 and permits the spring 64 to project the shifter member 60 outwardly to thus re-engage lock pin head 52 into locking engagement in internal gear 45 of pinion gear unit 40. The operator next loosens the index ring lock screw 85 to release this ring for rotation on bearing plate 11. The index ring V is then adjusted by turning in the required direction until the index line 86, which may be taken in this instance to be a zero line, is lined up with the zero line 71 of the micrometer scale S of the dial unit D. Or obviously index line 86 can be adjusted by rotating ring V until that line is lined up with any other desired graduation line of scale S. After the ring V is adjusted to position index line 86 relative to scale S as desired, the lock screw 85 is then tightened to lock ring V in its adjusted fixed position on plate 11.

Attention is directed to the fact that by our invention as exemplified in the selected adaptation thereof herein illustrated and described, the index ring V is mounted on fixed structure and even though the locking screw 85 thereof is located at the rear of dial unit D, no hazard is presented to the operator as neither the ring V nor screw 85 have any rotational movement during power drive of feed screw C, while the peripheral portion of the dial unit presents no radially projecting structure but solely a smooth, unbroken surface therearound. The sole member required to be operated for locking and unlocking the dial unit D for effecting adjustments thereof, is the finger knob 63, and it is located completely at the forward side of the dial unit where it is in full view at all times of the operator and in a position completely unobstructed for manual access thereto. The locking of the dial unit on the shaft extension 10 in an adjusted position is carried out by the positive type of locking connection provided by such members as the gear 25 with the pinion 41 in meshing engagement therewith. Hence, once in this locked and engaged position the inertia forces which may be generated by rotation of the dial unit when feed screw C is power driven will not displace the dial unit.

In the foregoing manner, an operator may quickly and with complete assurance of accuracy of the setting, adjust the micrometer dial mechanism for an absolute zero setting. The perfection of the setting is made possible by the combination of the micrometer dial unit D with the index ring V adjustably mounted on a mounting fixed relative to the dial unit, so that, the association and relationship of the index ring V and the dial unit D is not determined and controlled by the usual increments between the geared or tooth elements by which the preliminary adjustment and setting of the dial unit is effected. And while we have shown the index ring V with only the index line 86 thereon, it will be understood that any additional index markings or scale; such as a true vernier scale for cooperation with scale S of the dial unit, may be provided.

While we have shown the gear members 25 and 41 as the means for effecting positive connection of the dial unit D on the shaft 10, it is to be understood that we do not intend to limit the invention specifically to such gear members, as equivalent positive connecting members may be similarly utilized. The "toothed" head 52 of locking pin 51 and the internal gear 45 of the pinion 41, may have substituted therefor within the contemplation of our invention, equivalent members for obtaining the positive lock and release of the dial unit for rotation as a unit with the rotation relative to shaft 10, respectively.

It will also be evident to those skilled in the art, that various changes, modifications, substitutions, eliminations, and further uses and adaptations may be resorted to without departing from the broad spirit and scope of our invention, and, hence, it is not our intention to limit the invention in all respects to the exact and specific disclosures of the example embodiment herein illustrated and described, except as may be required by clearly intended specific limitation thereto included in any of the appended claims.

What we claim is:

1. In combination, a rotary element; a micrometer dial unit mounted on said element, including a circular dial body concentric with the axis of rotation of said element and being rotatable on said element independently thereof; mechanism operable to connect said dial body with or disconnect the same from said rotary element; a manually operable knob member mounted on said dial body in position accessible at the forward side thereof; and said knob member having a width less than the diameter of said dial body and being connected with said mechanism for effecting operation thereof selectively to either connect said dial body with or disconnect the same from said rotary element.

2. In combination, a rotary element; a micrometer dial unit mounted on said element, including a circular dial body concentric with the axis of rotation of said element and being rotatable on said element independently thereof to positions of angular adjustment therearound; mechanism operable to connect said dial body with or disconnect said body from said rotary element; a manually operable member mounted on said body in position accessible at the forward side thereof and having a width less than the diameter of said body; and said manually operable member being mounted on said dial body for movements in either direction axially thereof and being connected with said mechanism for effecting operation thereof selectively to either connect said dial body with or disconnect said body from rotary element.

3. In combination, a rotary element; a micrometer dial unit mounted on said element, said unit including a circular dial body mounted on said element for rotation independently thereof to positions of angular adjustment therearound; mechanism operable to connect said dial body with or disconnect said body from said rotary element; a manually operable member mounted on said dial body in position at and accessible from the forward side thereof for movements in directions inwardly toward and outwardly from and axially of said body; and said manually operable member having an external diameter substantially less than the external diameter of said dial body and being connected with said mechanism for effecting operation thereof to connect said dial body with said rotary element by movements of said member in a direction outwardly and for effecting operation of said mechanism to disconnect said body from said element by movements of the member in a direction inwardly, of said dial body, and means connected with said manually operable member adapted to continuously bias said member outwardly.

4. In combination, a rotary element; a circular dial body mounted on said element concentric therewith for rotation thereon independently thereof; mechanism operable to connect said dial body with or disconnect said body from said rotary element; a manually operable knob member movably mounted on said dial body concentric therewith at the forward side thereof and having a width less than the minimum diameter of said body; and means operatively connecting said knob member with said mechanism.

5. In combination, a rotary element; a circular dial body mounted on said element concentric therewith and being rotatable thereon independently thereof to adjusted positions; mechanism operable to connect said dial body with or disconnect said body from said element; a manually operable member mounted on said dial body at the forward side thereof; said manually operable member comprising a circular plate having a circular knob of smaller diameter than said plate and being extended forwardly from the plate; said manually operable member being mounted on said dial body at the forward side thereof with said plate and knob being concentric with the axis of said body; the forward side of said dial body being formed with a recess therein for receiving the plate of said manually operable member and said member being mounted on said dial body for movements inwardly toward and outwardly from said dial body; and means operatively connecting said manually operable member with said mechanism for effecting actuation of the latter to connect and disconnect said dial body with said rotary element by outward and inward movements respectively, of said member.

6. In combination, a rotary element; a dial body mounted on said element and being rotatable thereon independently thereof to adjusted positions; a gear member fixed on said rotary element concentric therewith; a gear member of smaller diameter freely rotatably mounted on said dial body in position in constant mesh with said rotary element mounted gear member; means operable to lock said dial body mounted gear member against rotation and for releasing said member for free rotation; and a manually operable member mounted on said dial body and being connected with said means for selectively operating the latter to lock or release said dial body mounted gear member.

7. In combination, a rotary element; a circular dial body mounted on said rotary element concentric therewith and being rotatable thereon independently thereof; a ring gear member fixed on said rotary element concentric therewith and being located in position housed within said dial body; a pinion gear member freely rotatably mounted on and within said dial body in position in constant mesh with said rotary element mounted ring gear; a locking member movably mounted on said dial body between a position engaged with and locking said pinion gear again rotation and a position disengaged from said pinion gear to release the latter for free rotation; and a manually operable member movably mounted on said dial body and being connected with said locking member for actuating the latter between position locking and position releasing said pinion gear member.

8. In combination, a rotary element; a circular dial body mounted on said rotary element concentric therewith and being rotatable thereon independently thereof; a ring gear fixed on said rotary element concentric therewith, said ring gear having a diameter less than the internal diameter of said dial body and being located within said body; a pinion gear mounted on said dial body for free rotation and being located within said body in position in constant mesh with said ring gear in any position of rotation of said dial body on and about said rotary element; said pinion gear being formed to provide an axially open, internal gear portion concentric with the axis thereof; a locking pin slidably mounted in said dial body in axial alignment with the axis of said pinion gear; and being provided with a toothed head for engagement in said internal gear of said pinion gear to lock the latter against rotation and for disengagement from said internal gear to release the pinion gear for free rotation; said locking pin being extended forwardly to the forward side of said dial body; and a manually operable member movably mounted at the forward side of said body and being connected with said locking pin for actuating the latter between pinion gear locking and pinion gear releasing positions.

9. In combination, a rotary element; a circular dial body mounted on said rotary element concentric therewith and being rotatable thereon independently thereof; a gear member fixed on said rotary element concentric therewith, said gear member having a diameter less than the internal diameter of said dial body and being located within said body; a pinion gear mounted on said dial body for free rotation about an axis parallel with the axis of said rotary element and being located within said body in position in constant mesh with said gear member; said pinion gear being formed to provide an axially open, internal gear portion concentric with the axis thereof; a locking pin slidably mounted in said dial body in axial alignment with the axis of said pinion gear and being provided with a toothed head for engagement in said internal gear of said pinion gear to lock the latter against rotation and for disengagement from said internal gear to release the pinion gear for free rotation; and means for selectively actuating said locking pin to pinion gear locking or pinion gear releasing position.

10. In the combination as defined in claim 9, said internal gear of said pinion gear comprised by tooth portions equally spaced therearound, and said toothed head of said locking pin being provided with a number of tooth forming portions equally spaced therearound equal to one-half the number of tooth portions of said internal gear.

11. The combination with a rotary element and a circular micrometer dial body mounted thereon concentric therewith, said dial body having therearound on a peripheral edge portion thereof a micrometer scale, and said dial body being rotatable on said rotary element to positions of adjustment therearound, of; an index ring mounted independently of said element and dial body concentric therewith and being positioned in immediate proximity to the micrometer scale bearing peripheral edge portion of said circular dial body, said index ring being provided with an index line thereon for cooperation with said dial body micrometer scale, and said index ring being mounted for rotation about said element as an axis to adjusted positions relative to said dial body to set the index line of said ring to a selected position relative to the micrometer scale of said dial body.

12. In combination, a support structure; a rotary element journaled on said support structure and being extended outwardly beyond the outer side of said structure; a mounting plate on the outer side of said support structure over and around the extended portion of said rotary element, said mounting plate being formed to provide a circular bearing surface therearound concentric with said rotary element; an index ring rotatably mounted on said circular bearing surface of said mounting member for rotation on said member to adjusted positions; means for locking said index ring in adjusted positions; a circular dial body mounted on said rotary element concentric therewith in position with its inner peripheral portion immediately adjacent said index ring; said dial body being mounted on said rotary element for rotation independently thereof to adjusted positions therearound; and means for releasably locking said dial body in adjusted positions on said rotary element.

13. In combination, a rotary element; a circular dial body mounted on said element concentric with the axis thereof and being rotatable on said element independently thereof, said dial body having therearound on the inner peripheral edge portion thereof a micrometer scale; mechanism adapted for operation to connect said dial body with or disconnect said body from said rotary element; a manually operable knob member mounted on said dial body in position accessible for operation at the forward side of the body; said knob member being mounted on said dial body for movements in either direction axially thereof and being connected with said mechanism for connecting and disconnecting the dial body and rotary element; an index ring mounted for rotation indepedently of said rotary element and dial body in position concentric therewith at the rear of the dial body in immediate proximity to the micrometer scale bearing, rear peripheral edge portion of said body; said index ring being provided with an index mark thereon for cooperation with said dial body micrometer scale; and means for releasably locking said dial body in adjusted positions on said rotary element.

PETER M. HENKES.
ELTON L. MIOTTEL.

REFERENCES CITED

The following references are of record in the file of this patent:

UNITED STATES PATENTS

| Number | Name | Date |
|---|---|---|
| 1,760,938 | Edgar | June 3, 1930 |
| 2,069,921 | Murray | Feb. 9, 1937 |
| 2,319,480 | Saving et al. | May 18, 1943 |